(12) United States Patent
Lupowitz et al.

(10) Patent No.: US 11,379,429 B1
(45) Date of Patent: Jul. 5, 2022

(54) COMPUTER-BASED SYSTEMS CONFIGURED FOR PERMISSION EVENTS MANAGEMENT ON A BLOCKCHAIN AND METHODS OF USE THEREOF

(71) Applicant: Tassat Group LLC, New York, NY (US)

(72) Inventors: Kevin Lupowitz, New York, NY (US); Eric Couillard, New York, NY (US); Jeff Yang, New York, NY (US); Chester Chee, New York, NY (US); Brian Bruce, New York, NY (US); Joe Grastara, New York, NY (US)

(73) Assignee: Tassat Group LLC, New York, NY (US)

( * ) Notice: Subject to any disclaimer, the term of this patent is extended or adjusted under 35 U.S.C. 154(b) by 0 days.

(21) Appl. No.: 17/513,455

(22) Filed: Oct. 28, 2021

(51) Int. Cl.
  *G06F 16/18* (2019.01)
  *G06F 9/46* (2006.01)
(52) U.S. Cl.
  CPC .......... *G06F 16/1805* (2019.01); *G06F 9/466* (2013.01)

(58) Field of Classification Search
  CPC .............................. G06F 16/1805; G06F 9/466
  See application file for complete search history.

(56) References Cited

U.S. PATENT DOCUMENTS

2019/0044714 A1* 2/2019 Parker .................. G06F 16/182
2020/0004854 A1* 1/2020 Inturi .................. G06F 16/2379

* cited by examiner

*Primary Examiner* — Loc Tran
(74) *Attorney, Agent, or Firm* — Greenberg Traurig, LLP

(57) ABSTRACT

Systems and methods enable permission events management on a blockchain. Embodiments include receiving a transfer event request for a movement of a number of tokens relative to a token storage via the blockchain. An event log record database is accessed which includes a total number of tokens of pending transfer event request records, and a total number of tokens in the token storage. A first permission is determined for generating a transfer event request record to the event log record database based on the number of the tokens exceeding the total logged number of tokens. An updated total logged number of tokens is determined with the transfer event request record and the transfer event request is transmitted to the distributed network. An updated total number of tokens in the token storage is determined based on the transfer event log record and a blockchain write permission determination.

20 Claims, 10 Drawing Sheets

COMPUTER-BASED SYSTEMS CONFIGURED FOR PERMISSION EVENTS MANAGEMENT ON A BLOCKCHAIN AND METHODS OF USE THEREOF

FIELD OF TECHNOLOGY

The present disclosure generally relates to computer-based systems configured for permission events management on a blockchain and methods of use thereof.

BACKGROUND OF TECHNOLOGY

Typically, in a blockchain transaction environment "permissions" are commonly handled through N-of-M multi-signature ("multisig") format. For example, sending from a "2 of 3" multisig wallet would require that two of three parties consent to submit a transaction. In a blockchain sense, a transaction is not real until sent out and confirmed on the blockchain.

BRIEF SUMMARY

Embodiments described herein include a method for permission events management on a blockchain. The method includes: receiving, by at least one processor, from a first node associated with a first token storage, a transfer event request for a movement of a number of tokens relative to the first token storage via a distributed network, where the distributed network includes a blockchain; accessing, by at least one processor, an event log record database, where the event log record database includes a transfer event logged token number indicating a total logged number of tokens, including: i) a total number of tokens of pending transfer event request records with respect to the first token storage, and ii) a total number of tokens in the first token storage; determining, by the at least one processor, a first permission for generating a transfer event request record to the event log record database based on: the transfer event request and the number of the tokens exceeding the total logged number of tokens as logged in the event log record database; determining, by the at least one processor, an updated total logged number of tokens by generating the transfer event request record to the pending transfer event request records of the event log record database so as to remove the number of tokens from the total number of tokens of the pending event request records; transmitting, by the at least one processor, the transfer event request to the distributed network; utilizing, by the at least one processor, at least one smart contract to cause the number of the tokens to be transferred on the blockchain based at least in part on the transfer event request and the event log record; receiving, by the at least one processor, a blockchain write permission determination by the distributed network for the movement of the number of tokens on the distributed network; and determining, by the at least one processor, an updated total number of tokens in the first token storage based at least in part on the transfer event log record and the blockchain write permission determination.

Embodiments described herein include a system for permission events management on a blockchain. The system includes at least one processor in communication with at least one storage device. The at least one processor is configured to access software instructions in the at least one storage device that cause the at least one processor to perform steps to: receive, by at least one processor from a first node associated with a first token storage, a transfer event request for a movement of a number of tokens relative to the first token storage via a distributed network, where the distributed network includes a blockchain; access, by at least one processor, an event log record database, where the event log record database includes transfer event logged token number indicating a total logged number of tokens including: i) a total number of tokens of pending transfer event request records with respect to the first token storage, and ii) a total number of tokens in the first token storage; determine a first permission for generating a transfer event request record to the event log record database based on: the transfer event request and the number of the tokens exceeding the total logged number of tokens as logged in the event log record database; determine an updated total logged number of tokens by generating the transfer event request record to the pending transfer event request records of the event log record database so as to remove the number of tokens from the total number of tokens of the pending event request records; transmit the transfer event request to the distributed network; utilize at least one smart contract to cause the number of the tokens to be transferred on the blockchain based at least in part on the transfer event request and the event log record; receive a blockchain write permission determination by the distributed network for the movement of the number of tokens on the distributed network; and determine an updated total number of tokens in the first token storage based at least in part on the transfer event log record and the blockchain write permission determination.

Embodiments of one or more systems and/or methods for permission events management on a blockchain further include transmitting, by the at least one processor, the transfer event request to at least one second node on the distributed network, where the at least one processor includes at least one approver node of a plurality of nodes in the distributed network; and receiving, by the at least one processor, a second permission from the at least one second node approving the transfer event request.

Embodiments of one or more systems and/or methods for permission events management on a blockchain further include where the at least one approver node is permissioned to make transactions requests and to approve transfer event requests.

Embodiments of one or more systems and/or methods for permission events management on a blockchain further include where the first node includes a maker node permissioned to make transfer event requests.

Embodiments of one or more systems and/or methods for permission events management on a blockchain further include: receiving, by the at least one processor, the transfer event request including a token deposit request, where the token deposit request is for a deposit of the number of tokens into the first token storage; generating, by the at least one processor, at least one asset deposit operation instruction to an asset database, where the at least one asset deposit operation instruction causes the asset database to add an asset quantity to a first user account, where the asset quantity is associated with the number of tokens, where the first user account is associated with the first token storage; and utilizing, by the at least one processor, the at least one smart contract to cause the number of the tokens to be added to the first token storage.

Embodiments of one or more systems and/or methods for permission events management on a blockchain further include utilizing, by the at least one processor, the at least one smart contract to cause the number of the tokens to be minted on the blockchain based at least in part on the transfer event request so as to and the number of tokens to the first token storage.

Embodiments of one or more systems and/or methods for permission events management on a blockchain further include: receiving, by the at least one processor, the transfer event request including a token redeem request, where the token redeem request is for a redemption of tokens from the first token storage; generating, by the at least one processor, at least one asset redeem operation instruction to an asset database, where the at least one asset redeem operation instruction causes the asset database to remove an asset quantity to a first user account, where the asset quantity is associated with the number of tokens, where the first user account is associated with the first token storage; and utilizing, by the at least one processor, the at least one smart contract to cause the number of the tokens to be removed to the first token storage.

Embodiments of one or more systems and/or methods for permission events management on a blockchain further include utilizing, by the at least one processor, the at least one smart contract to cause the number of the tokens to be burned from the blockchain based at least in part on the transfer event request so as to remove the number of tokens to the first token storage.

Embodiments of one or more systems and/or methods for permission events management on a blockchain further include: receiving, by the at least one processor, the transfer event request including a token send request, where the token send request is for a transfer of tokens from the first token storage to a second token storage or a second node on the distributed network; generating, by the at least one processor, at least one asset transfer operation instruction to an asset database, where the at least one asset transfer operation instruction causes the asset database to: remove an asset quantity to a first user account and add the asset quantity to a second user account, where the asset quantity is associated with the number of tokens, where the first user account is associated with the first token storage, where the second user account is associated with the second token storage; utilizing, by the at least one processor, the at least one smart contract to cause the number of the tokens to be removed to the first token storage; and utilizing, by the at least one processor, the at least one second smart contract to cause the number of the tokens to be added to the second token storage.

Embodiments of one or more systems and/or methods for permission events management on a blockchain further include: utilizing, by the at least one processor, the at least one smart contract to cause the number of the tokens to be burned from the blockchain based at least in part on the transfer event request so as to remove the number of tokens to the first token storage; and further including utilizing, by the at least one processor, the at least one second smart contract to cause the number of the tokens to be minted on the blockchain based at least in part on the transfer event request so as to add the number of tokens to the second token storage.

Embodiments of one or more systems and/or methods for permission events management on a blockchain further include instructing, by the at least one processor, at least one account database to perform a monetary movement in at least one account associated with the first token storage based at least in part on the movement of the number of tokens relative to the first token via the distributed network.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1A:
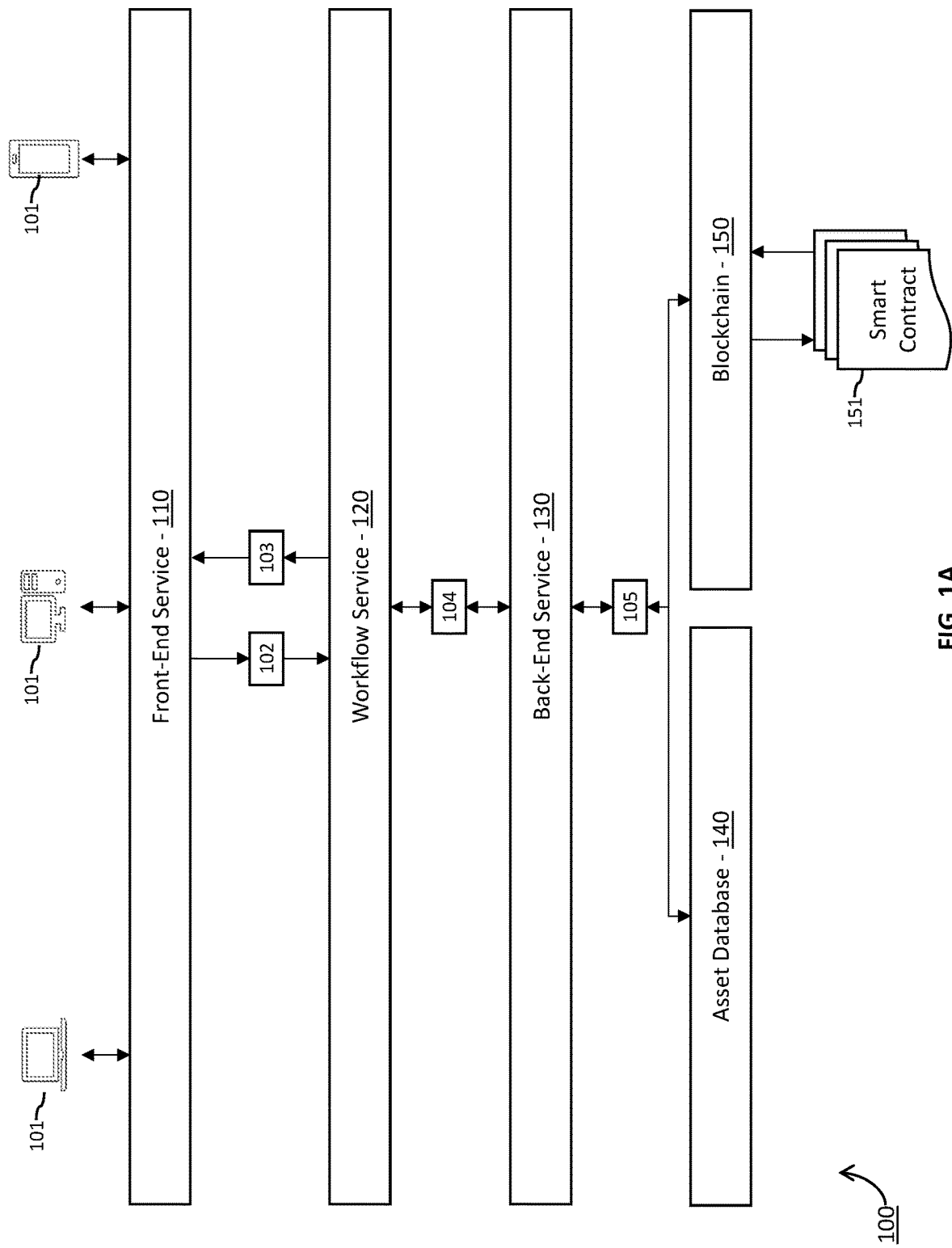
FIG. 1A depicts a block diagram of a distributed network architecture for event permission in a permission queue for submission to a blockchain in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 9 illustrate systems and methods of pre-validating event requests before multisig permission on a blockchain. The following embodiments provide technical solutions and technical improvements that overcome technical problems, drawbacks and/or deficiencies in the technical fields involving blockchain event permissions that utilize a multisig permission process for each event on the blockchain, even where events are duplicates or with respect to the same tokens. As explained in more detail, below, technical solutions and technical improvements herein include aspects of improved event validation efficiency to decrease blockchain resource demands by establishing pre-permission to prevent multiple use of individual tokens without requiring multisig permission.

In a pure blockchain transaction environment "permissions" are commonly handled through N-of-M multisignature ("multisig"). For example, sending from a "2 of 3" multisig wallet would require that two of three parties consent to submit an event. In a blockchain sense, a transaction is not real until sent out and confirmed on chain.

In some embodiments, rather than allow event requests (e.g., blockchain transactions) for more tokens than exist to be in be in the permission queue, tokens may be locked while in proposed (unapproved) event request. By using the permission queue to lock tokens while in a proposed state, subsequent event requests for the same tokens or for more tokens than exist in the user's wallet may be rejected before the locked event request or subsequent event request(s) are submitted to the blockchain. In some embodiments, without locking tokens in the permission queue, the tokens could be in the queue multiple times. For example, for a wallet with 1,000 tokens where user A is a maker and user B is an approver, user A may submit a send for 700 tokens and another for 1,000 tokens, and another for 800 tokens . . . and so on. As long as the tokens in the permission queue are not locked and remain available, user A can keep creating new (pending) sends which would require a large number of resources in a distributed network of the blockchain environment to process each request, including multisig permissions and denials. However, in using the permission queue to lock the tokens of the first send request, any subsequent requests can be approved or denied based on the tokens of the first send request being locked and removed from the wallet of user A. If the first send request is approved, the locked tokens are included in a transaction on the blockchain. If a transaction is rejected, the tokens are unlocked and returned to available in the wallet.

Based on such technical features, further technical benefits become available to users and operators of these systems and methods. Moreover, various practical applications of the disclosed technology are also described, which provide further practical benefits to users and operators that are also new and useful improvements in the art.

Figure 1B:
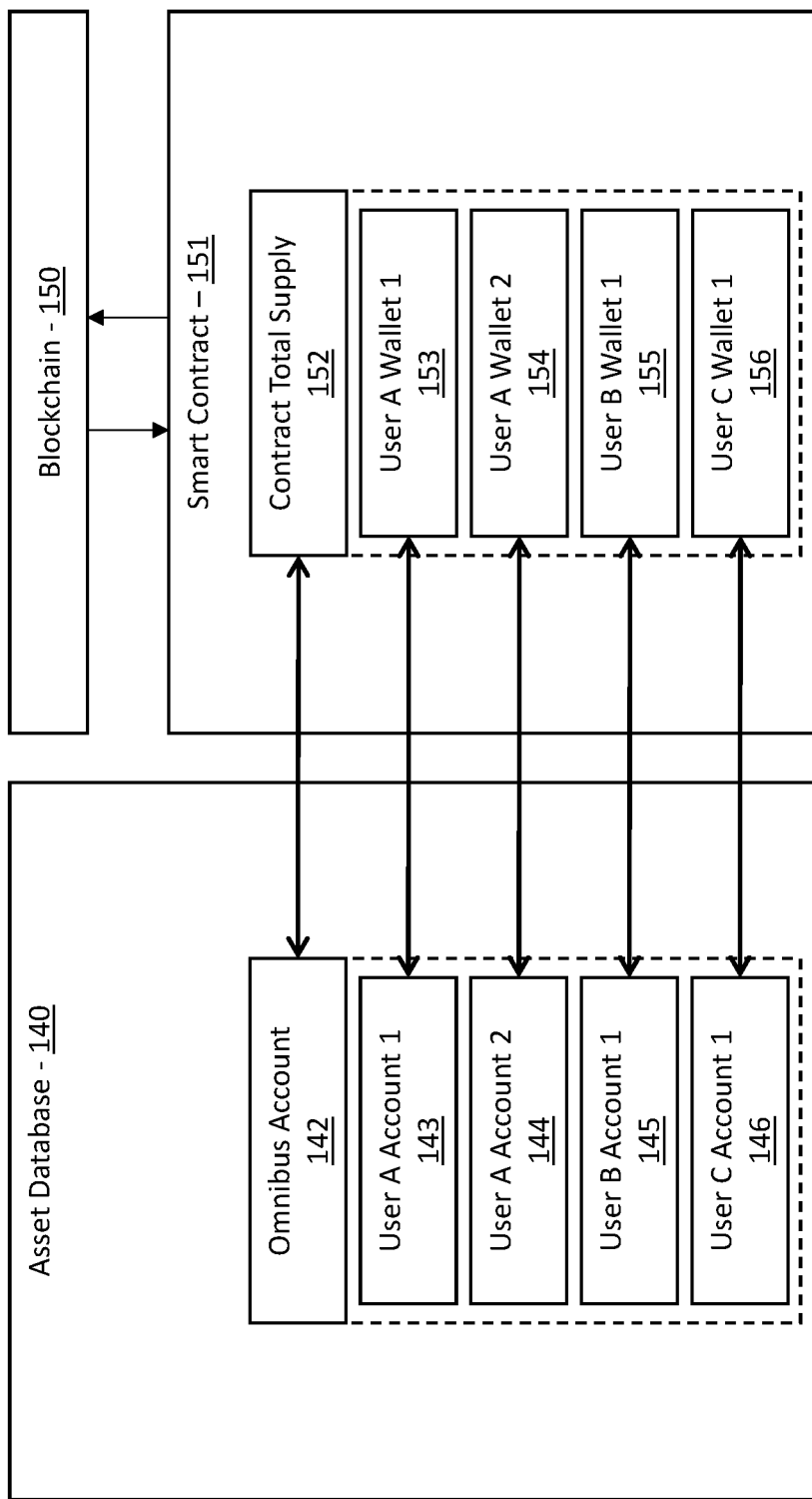
FIG. 1B depicts a block diagram of a smart contract 151 including a mapping of user wallets on the blockchain 150 to user accounts in the asset database 140 in accordance with one or more embodiments of the present disclosure.

FIG. 1A depicts a block diagram of a distributed network architecture for event permission in a permission queue for submission to a blockchain in accordance with one or more embodiments of the present disclosure. FIG. 1B depicts a block diagram of a smart contract 151 including a mapping of user wallets on the blockchain 150 to user accounts in the asset database 140 in accordance with one or more embodiments of the present disclosure.

In some embodiments, a hybrid blockchain environment 100 may include nodes including user device 101 that interface with a blockchain 150 via one or more service layers. In some embodiments, the service layers may include, e.g., a front-end service 110, a workflow service 120 and a back-end service 130. Each user device 101 may submit event requests 102 that employ tokens on the blockchain by submitting the event request 102 via the front-end service 110. The front-end service 110 may engage the workflow service 120 to initiate a workflow based on the event request 102, which may employ the back-end service 130 to instruct the blockchain 150 as well as an asset database 140 to store, transfer, record or otherwise operate on asset records associated with the token(s) of the event request 102.

In some embodiments, the asset database 140 may track one or more state(s) of one or more asset(s) and/or operation(s) on asset(s) represented by token(s) of the blockchain 150. In some embodiments, the asset database 140 may be the source of truth for in-progress workflows with regards to event requests 102. Thus, states of the workflow may depend on entries in the asset database 140.

Using the asset database 140 as a source of truth provides resilient records in the case of a system outage. However, asset and operation states in the asset database 150 may become out of sync with tasks in the workflow due to, e.g., lag in acknowledgement of tasks and/or states. Accordingly, in some embodiments, the workflow service 120 may track the state of each event request 102 in order to maintain a synchronized source of truth. In so doing, the workflow service 120 may track states of each token in each event request 102 and lock each token and/or token quantity while in an in-progress workflow.

In some embodiments, the hybrid blockchain environment 100 may receive event requests 102 from one or more user devices 101 that interface with the front-end service 110. In some embodiments, the hybrid blockchain environment 100 may be a part of the user computing device 101. Thus, the hybrid blockchain environment 100 may include hardware and software components including, e.g., user computing device 101 hardware and software, cloud or server hardware and software, or a combination thereof.

In some embodiments, the hybrid blockchain environment 100 may include hardware components such as one or more processors, which may include local or remote processing components. In some embodiments, the processor(s) may include any type of data processing capacity, such as a hardware logic circuit, for example an application specific integrated circuit (ASIC) and a programmable logic, or such as a computing device, for example, a microcomputer or microcontroller that include a programmable microprocessor. In some embodiments, the processor(s) may include data-processing capacity provided by the microprocessor. In some embodiments, the microprocessor may include memory, processing, interface resources, controllers, and counters. In some embodiments, the microprocessor may also include one or more programs stored in memory.

Similarly, the hybrid blockchain environment 100 may include storage, such as one or more local and/or remote data storage solutions such as, e.g., local hard-drive, solid-state drive, flash drive, database or other local data storage solutions or any combination thereof, and/or remote data storage solutions such as a server, mainframe, database or cloud services, distributed database or other suitable data storage solutions or any combination thereof. In some embodiments, the storage may include, e.g., a suitable non-transient computer readable medium such as, e.g., random access memory (RAM), read only memory (ROM), one or more buffers and/or caches, among other memory devices or any combination thereof.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be transferred around and scaled up (or down) on the fly without affecting the end user). The aforementioned examples are, of course, illustrative, and not restrictive.

In some embodiments, the asset database 140 may be a database in the hybrid blockchain environment 100, or may be a database in communication with the hybrid blockchain environment 100. Accordingly, in some embodiments, the asset database 140 may be implemented either in direct communication with cloud server(s) to provide software services, e.g., controlled by the back-end service 130, or may be remote from the cloud server(s), e.g., via messaging across a network between the back-end service 130 and the asset database 140. In some embodiments, the asset database 140 may accessed directly via suitable database queries, or indirectly via suitable application programming interface (API) calls, or other suitable messaging data querying technologies or any combination thereof.

In some embodiments, the hybrid blockchain environment 100 may implement computer engines for the front-end service 110, workflow service 120, back-end service, asset database 140 and blockchain 150. In some embodiments, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

In some embodiments, the front-end service 110, workflow service 120, back-end service, and asset database 140 may be associated with and/or manage by the same administrator (e.g., enterprise). In some embodiments, the front-end service 110, workflow service 120, and back-end service may be associated with and/or manage by one entity/administrator (e.g., a first enterprise); and the asset database 140 may be associated with and/or manage by another entity/administrator (e.g., a second enterprise).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In some embodiments, each of the front-end service 110, workflow service 120, back-end service, asset database 140 and blockchain 150 may include separate hardware and/or software components. Accordingly, in some embodiments, each of the front-end service 110, workflow service 120, back-end service, asset database 140 and blockchain 150 may include at least one processor(s) and at least one memory and/or storage solution, among other hardware and/or software components.

In some embodiments, the front-end service 110, workflow service 120, back-end service, asset database 140 and blockchain 150 may share one or more hardware and/or software components, such as, e.g., in a cloud environment and/or distributed network. Accordingly, in some embodiments, one or more of the front-end service 110, workflow service 120, back-end service, asset database 140 and/or blockchain 150 may share one or more processor(s) and/or one or more storage/memory solutions. Hardware components and software components of the blockchain environment 100 may be employed in any suitable combination of shared and/or dedicated forms to provide the front-end service 110, workflow service 120, back-end service, asset database 140 and blockchain 150.

In some embodiments, the user devices 101 may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, the user devices 101 may include any computing device from electronic activities are performed or executed, such as, e.g., a terminal, personal computer, or mobile computing device for performing Internet-based and application-based activities (e.g., account logins, account information changes, online purchases, instant message communications, social media posts, among others and combinations thereof).

In some embodiments, the user devices 101 may include a physical terminal for performing electronic transactions, such as, e.g., a point-of-sale device, automated teller machine (ATM) or other device. As a result of a user executing electronic activities via the electronic activity execution device, data entries may be produced for entry into the user's account. For example, the electronic activity execution device may produce an electronic activity data entry.

In some embodiments, the front-end service 110 may provide an interface between the user devices 101 and the back-end service 130. In some embodiments, the front-end service 110 may include any user-facing part of the platform architecture, such as, e.g., subcomponents that make up the user experience. In some embodiments, the front-end service 110 may include a user interface and/or any software that allows platform software to be provided to the user devices 101, such as, e.g., a web browser, a client-side application, or other software enabling the user to interact with the hybrid blockchain platform 100 from a user device 101.

In some embodiments, the front-end service 110 may interact with the workflow service 120 and/or the back-end service 130. In some embodiments, the front-end service 110 may receive user inputs and user selections from the user devices 101 and convey data representing the user input and/or user selections to the workflow service 120 and/or the back-end service 130 via a suitable messaging and/or interface technology, such as, e.g., one or more application programming interfaces (API). In some embodiments, the term "application programming interface" or "API" may include a computing interface that defines interactions between multiple software intermediaries. An "application programming interface" or "API" defines the kinds of calls or requests that can be made, how to make the calls, the data formats that should be used, the conventions to follow, among other requirements and constraints. An "application programming interface" or "API" can be entirely custom, specific to a component, or designed based on an industry-standard to ensure interoperability to enable modular programming through information hiding, allowing users to use the interface independently of the implementation.

In some embodiments, the workflow service 120 may one or more applications, software, services, microservices and/or functions provided by the back-end service 130, such as, e.g., a cloud service or microservice. In some embodiments, the workflow service 120 may include one or more applications, services and/or functions for managing operations and components of the back-end service 130. Management software is in charge of allocating specific resources for certain tasks. Accordingly, in some embodiments, the workflow service 120 may include, e.g., middleware that interfaces between the back-end service 130 and the front-end service 110, an orchestrator and/or scheduler for the back-end service 130, or other software for coordinating and orchestrating resources of the back-end service 130 in a dynamic and real-time manner.

In some embodiments, the back-end service 130 may include one or more components of the hybrid blockchain platform 100 such as hardware and storage for providing one or more applications, servicers and/or functions to the user devices 101 via the front-end service 110 responsive to the user input and/or user selection. In some embodiments, the back-end service 130 may provide software functionality to the front-end service 110 via, e.g., one or more networks.

In some embodiments, the network may include any suitable computer network, including, two or more computers that are connected with one another for the purpose of communicating data electronically. In some embodiments, the network may include a suitable network type, such as, e.g., a local-area network (LAN), a wide-area network (WAN) or other suitable type. In some embodiments, a LAN may connect computers and peripheral devices in a physical area, such as a business office, laboratory, or college campus, by means of links (wires, Ethernet cables, fiber optics, wireless such as Wi-Fi, etc.) that transmit data. In some embodiments, a LAN may include two or more user devices 101 including, e.g., personal computers, printers, and high-capacity disk-storage devices called file servers, which enable each computer on the network to access a common set of files. LAN operating system software, which interprets input and instructs networked devices, may enable communication between devices to share the printers and storage equipment, simultaneously access centrally located processors, data, or programs (instruction sets), and other functionalities. Devices on a LAN may also access other LANs or connect to one or more WANs. In some embodiments, a WAN may connect computers and smaller networks to larger networks over greater geographic areas. A WAN may link the computers by means of cables, optical fibers, or satellites, or other wide-area connection means. In some embodiments, an example of a WAN may include the Internet and/or a blockchain network (e.g., the blockchain 150).

In some embodiments, to initiate a workflow, a user device 101 may instruct the front-end service 110 to issue an event request 102 with respect to a token storage, such as a cryptocurrency wallet or other wallet, of a node on the blockchain 150. In some embodiments, the user device 101 may be the node and/or may be associated with the node. In some embodiments, the event request 102 may include a request to perform a movement of tokens from the token storage to another token storage of another node on the blockchain 150, such as, e.g., another user device 101 and/or a token storage associated with the hybrid blockchain platform 100, e.g., associated with the asset database 140.

In some embodiments, the user device 101 may present an event control graphical user interface (GUI) for producing event requests 102, notifying the user of approved and/or rejected event requests 102, as well as other information such as user account information (e.g., for a user account in the asset database 140), user wallet information (e.g., associated with a blockchain wallet on the blockchain 150), etc. In some embodiments, the front-end service 110 may provide the event control GUI to a user device 101 to enable the user to select a particular event request related to an account operation and/or wallet operation.

In some embodiments, in response to the user selection of the particular event request 102, the front-end service 110 may issue the event request 102 to the workflow service 120 and/or the back-end service 130, e.g., via an API or other suitable interface and/or messaging technology. As described above, in some embodiments, the workflow service 120 may be an application, service or other software function implemented by the back-end service 130 for controlling a workflow associated with an event request 102, and/or the workflow service 120 may manage the back-end service 140 to implement the workflow associated with the event request 102.

Accordingly, in some embodiments, the event request 102 may be associated with a particular workflow for effectuating events on the blockchain 150 and/or in the asset database 140 to perform account-related operations. For example, in some embodiments, the event request 102 may include a request for a movement of assets and/or tokens with respect to another user. The movement may be subdivided into a workflow of tasks. For example, sending assets and/or tokens to a destination, such as to another user and/or to an omnibus account for conversion to an asset, may include the tasks of depositing assets to mint tokens for the first user, sending the tokens to the destination, and the redeeming the tokens in exchange for the assets at the destination. Thus, the sequence of tasks can be used to perform operations such a transfer of assets, a withdrawal of assets, a deposit of assets, among other operations using the blockchain 150 to provide a verifiable and immutable record for more efficient and secure operations. Other operations and workflows may implement.

Thus, in some embodiments, the workflow service 120 may identify a workflow associated with the event request 102 and exchange one or more task-related messages 104 with the back-end service 140 to implement the workflow. Because the workflow affects the movement of assets in a user account via the movement of tokens on the blockchain 150, the movement of assets is controlled by authentication by the blockchain 150. Indeed, the movement associated with each event request 102 is authenticated on the blockchain 150 before allowing assets to leave and/or enter a user account in the asset database 140. As a result, the movements in the asset database 140 between accounts, the movements of tokens on the blockchain 150, the issuance of event requests 102 may become out of synchronization upon multiple event requests 102 while the authentication of each movement is performed. As a result, events requested by event requests 102 may be rejected by the blockchain 150 in an unpredictable manner as some events achieve authentication faster before others in an asynchronous manner.

In some embodiments, to enforce synchronous events related to each user account and each associated token storage, the workflow service 130 may provide a source of truth for tracking in progress events in a sequential queue based on first-in-first-out ordering. Therefore, any particular event request 102 may be processed in the order that is submitted, thus preventing unpredictable and improper authentications, such as, e.g., double spend transactions, quantities of movement in excess of an account and/or token storage balance, among other improper authentications before requiring blockchain 150 resources. Table 1 below shows an example of an account record of the asset database 140 as a source of truth for operations. As shown in Table 1, the deposit request for operation 100, the deposit request for operation 200 and the operation request for operation 300 may be acknowledged out of order with which the operations were requested. As a result, the asset database 140 value, and thus the workflow value, diverge from the true value of assets available in a particular user account.

TABLE 1

Example of Asset Value of a User Account using the Asset Database 140 as a Source of Truth

| MESSAGE | WORKFLOW VALUE | ASSET DATABASE VALUE | TRUE AMOUNT |
|---|---|---|---|
|  | 40,000 | 40,000 | 40,000 |
| DEPOSIT REQ. 1 (100 FOR +30,000) | 70,000 | 40,000 | 70,000 |
| ACK. FILE (300 FOR −20,000) | 50,0000 | 40,000 | 50,000 |
| OPERATION REQ. FOR 100 | 50,000 | 70,000 | 50,000 |
| OPERATION REQ. FOR 300 | 50,000 | 50,000 | 50,000 |
| OPERATION ACK. FOR 100 | 70,000 | 50,000 | 50,000 |
| DEPOSIT REQ. 2 (200 FOR +60,000) | 130,000 | 50,000 | 110,000 |
| OPERATION ACK. FOR 300 | 50,000 | 50,000 | 110,000 |
| OPERATION REQ. FOR 200 | 130,000 | 50,000 | 110,000 |
| OPERATION ACK. FOR 200 | 130,000 | 130,000 | 110,000 |

In some embodiments, the permission queue of the workflow service 120 may identify the tokens and/or number of tokens subject to the workflow of the event request 102 and lock the tokens and/or number of tokens from use for subsequent movements until the event request 102 has been either approved or rejected. Table 2 below shows an example illustrating using the workflow service 120 to provide the source of truth. As shown in Table 2, while the asset database 140 shows a lag in updating the value available to the user account, the workflow service 120 can ignore the lag to show the true value, and thus approve or reject operations before submission to the blockchain 150 and recordation in the asset database 140.

TABLE 2

Example of Asset Value of a User Account using the Workflow Service 120 as a Source of Truth

| MESSAGE | WORKFLOW VALUE | ASSET DATABASE VALUE | TRUE AMOUNT |
|---|---|---|---|
|  | 40,000 | 40,000 | 40,000 |
| DEPOSIT REQ. 1 (100 FOR +30,000) | 70,000 | 40,000 | 70,000 |
| ACK. FILE (300 FOR −20,000) | 50,0000 | 40,000 | 50,000 |
| OPERATION REQ. FOR 100 | 50,000 | 70,000 | 50,000 |
| OPERATION REQ. FOR 300 | 50,000 | 70,000 | 50,000 |
| OPERATION ACK. FOR 100 | 50,000 | 50,000 | 50,000 |
| DEPOSIT REQ. 2 (200 FOR +60,000) | 110,000 | 50,000 (lagged) | 110,000 |
| OPERATION ACK. FOR 300 | 110,000 | 110,000 | 110,000 |
| OPERATION REQ. FOR 200 | 110,000 | 110,000 | 110,000 |
| OPERATION ACK. FOR 200 | 110,000 | 110,000 | 110,000 |

Accordingly, in some embodiments, the workflow service 120 may maintain an event log record database for a particular user. In some embodiments, the event log record database may record a token quantity and an operation requested via the event request 102. In some embodiments, the event request 102 may include additional data attributes, such as, e.g., an operation type, a destination token storage for a movement, a source token storage for a movement, a user identifier, a transaction identifier, among other data attributes or any combination thereof.

Therefore, in some embodiments, as multiple event requests 102 are received, the workflow service 120 may record the token quantity of each event request 102 to determine a transaction queue token quantity indicative of a total number of tokens subject to one or more operations for a given token storage of a given user. In some embodiments, the transaction queue token quantity may be used to automatically approve and/or reject subsequent event requests 102 based on a comparison of the transaction queue token quantity and a token quantity balance in the given token storage. If the transaction queue token quantity is equal to or exceeds the token quantity balance, the workflow service 120 may automatically reject the subsequent event request, effectively locking the tokens subject to existing event requests 102 in the transaction queue. As a result, the user is prevented from requesting operations using more tokens than are available in the given token storage. Where the transaction queue token quantity is less than the token quantity balance, the workflow service 120 may determine a first permission approving the event request 102 as a valid event request 102.

In some embodiments, the event requests 102 in the transaction queue may be passed to the back-end service 130 via one or more task-related messages 104 for processing in the order in which they were received. In some embodiments, the task-related message(s) 104 may include, e.g., one or more tasks identified by the workflow service 120 as associated with a particular event request 102, such as, e.g., an operation request for an account operation, an operation acknowledgement approving an account operation, an operation rejection rejecting an account operation, among other task-related messages 104 for performing tasks to carry out an event request 102, or any combination thereof.

In some embodiments, the processing of the task-related message(s) 104 may include operation instructions 105 to the asset database 140, the blockchain 150 or both. For example, in some embodiments, where the workflow service 120 approves an event request 102 and enters the event request 102 into the transaction queue, an associated task-related message 104 is sent to the back-end service 130. As a result, the back-end service 130 may generate an operation initiation instruction 105 to the blockchain 150 to cause the blockchain 150 to perform the movement of tokens according to the task-related message(s) 104. In some embodiments, the operation initiation instruction 105 may specify the operation to be performed related to tokens of the user's token storage. Accordingly, in some embodiments, the operation initiation instruction 105 may include data attributes such as a token quantity, an operation type, a source token storage, a destination token storage, a transaction identifier, among other data attributes or any suitable combination thereof.

In some embodiments, based on the operation type, the operation initiation instruction 105 may cause the blockchain 150 to initiate a smart contract 151 for performing the operation. In some embodiments, the operation type may include, e.g., a token redeem, a token deposit, a token transfer, among other operation types or any combination thereof. In some embodiments, a token redeem operation may cause a smart contract 151 for burning tokens (e.g., erasing tokens from the blockchain), and thus removing the tokens from the token storage of the user. As a result, the smart contract 151 and/or the back-end service 130 may issue an operation initiation instruction 105 to the asset database 140 to provide assets represented by the tokens to the user, e.g., in the user's account in the asset database 140. Additionally, in some embodiments, a token deposit operation may cause a smart contract 151 for minting tokens (e.g., producing new tokens on the blockchain), and thus adding the tokens from the token storage of the user. As a result, the smart contract 151 and/or the back-end service 130 may issue an operation initiation instruction 105 to the asset database 140 to remove assets represented by the tokens from the user, e.g., from the user's account in the asset database 140.

In some embodiments, a token transfer operation may cause a smart contract 151 to move tokens from a first token storage (the source token storage) to a second token storage (the destination token storage). As a result, the transfer of tokens from the first to the second token storage may cause a movement of assets from a first user account to a second user account associated with users of the first token storage and the second token storage, respectively. Alternatively, in some embodiments, the token transfer operation may cause a smart contract 151 to perform a token redeem operation for the first token storage to thereby remove a corresponding quantity of assets from the user account. The quantity of assets may then be transferred via the asset database 140 to a second user account associated with the second token storage, and the same or a different smart contract 151 may perform a token deposit operation to mint tokens on the blockchain in the second token storage.

In some embodiments, to generate the operation initiation instruction 105 for each movement of assets in the asset database 140, the smart contract 151 may specify the user account associated with each token storage of the movement of tokens. Accordingly, in some embodiments, the smart contract 151 may employ a mapping of user accounts to user token storages (e.g., wallets) as illustrated in FIG. 1B. In some embodiments, User A may have a User A Account 1 143 in the asset database 140 mapped to a User A wallet 1 153 on the blockchain 150. Similarly, User A may have a User A Account 2 144 in the asset database 140 mapped to a User A wallet 2 154 on the blockchain 150, User B may have a User B Account 1 145 in the asset database 140 mapped to a User B wallet 1 155 on the blockchain 150, User C may have a User C Account 1 146 in the asset database 140 mapped to a User C wallet 1 156 on the blockchain 150, etc. for each account of each user in a one-to-one manner. Similarly, in some embodiments, there may be an omnibus account 142 in the asset database 140, e.g., associated with a financial entity (e.g., bank, mortgage company, lender, credit agency, credit union, etc.) or other asset management entity or any combination thereof. The omnibus account 142 may be mapped to a contract total supply 152 that specifies a total number of tokens on the blockchain 150. Accordingly, the smart contract 151 may specify account operations based on token operations performed on the blockchain 150 in order to allow the back-end service 130 to match operations in the asset database 140 to the immutable ledger of the blockchain 150.

In some embodiments, the blockchain 150 may include one or more private and/or private-permissioned crypto-graphically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a digital chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

In some embodiments, based on the operation initiation instruction(s) 105 and the balance of tokens in each token storage associated with a movement of tokens, the operations of the existing event requests 102 in the transaction queue may be approved and/or rejected on the blockchain 150. As a result, the blockchain 150 produce a write permission determination regarding the movement of the tokens with respect to the associated token storages. In some embodiments, the write permission determination may include, e.g., the transaction details of a new block in the ledger, an indication of a permission or rejection, among other data indicative of whether the operation is successful or unsuccessful or any combination thereof.

In some embodiments, the back-end service 130 may provide the write permission determination to the workflow service 120, e.g., via a task-related message 104. The workflow service 120 may then update the event log record database to reflect a completed event request of the associated event request 102 in the event log record database. In some embodiments, where the write permission determination results in the associated event request 102 being successfully processed to effectuate the movement of tokens, the event log record database may be updated to release the tokens from the event log record database, thus removing the tokens subject to the associated event request 102 from the total number of tokens of the event log record database. As a result, the event log record database is synchronized with the token storage to provide an accurate and efficient source of truth for allowing or rejecting event requests 102 prior to submission to the back-end service 130 and blockchain 150, thus preventing the attempted use of tokens that are already subject to operations associated with existing event requests 102.

Figure 2:
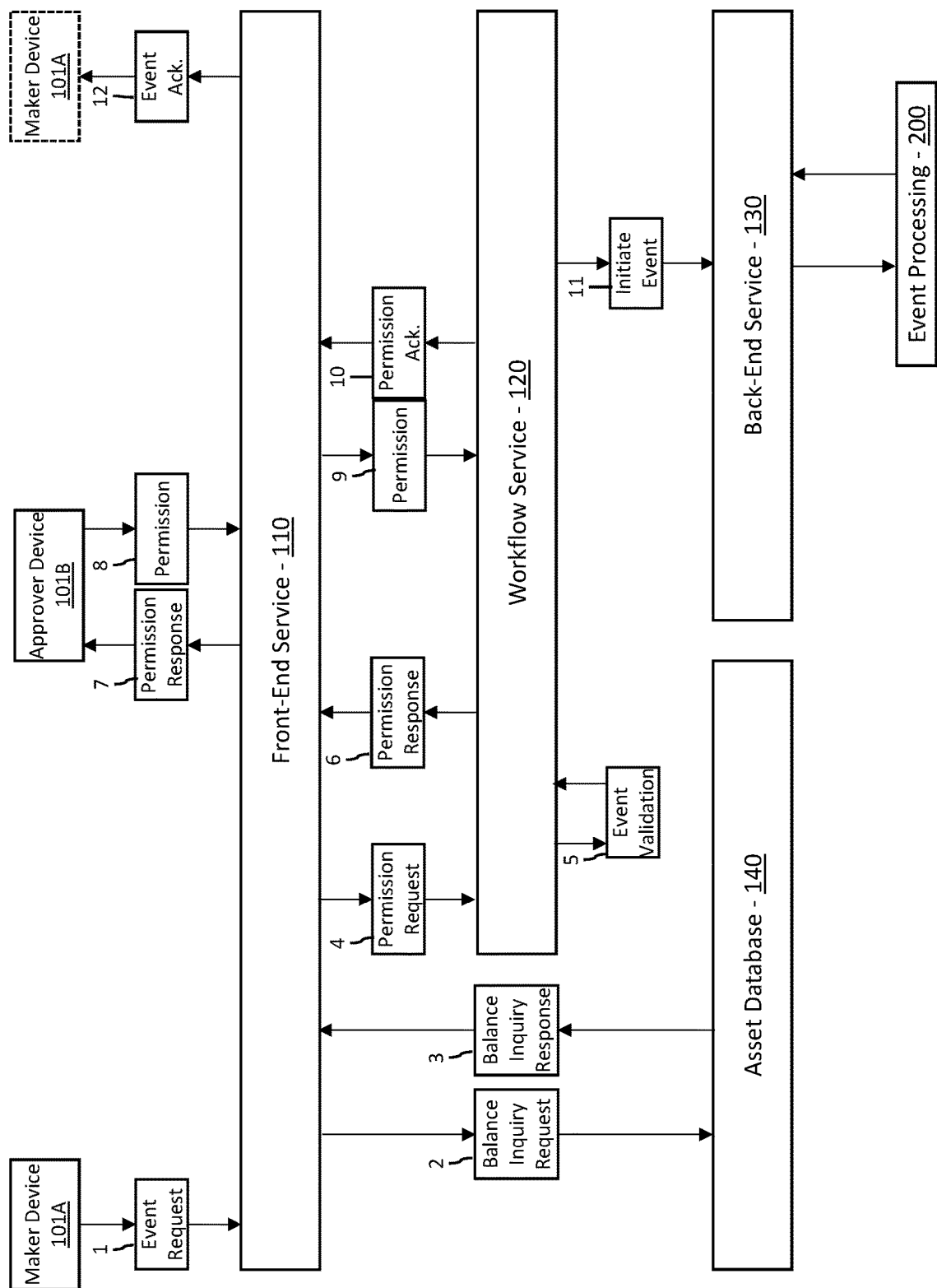
FIG. 2 illustrates a workflow orchestration for event request permission via a workflow service for controlling blockchain events in accordance with one or more embodiments of the present disclosure.

FIG. 2 illustrates a workflow orchestration for event request permission via a workflow service for controlling blockchain events in accordance with one or more embodiments of the present disclosure.

In some embodiments, upon receiving an event request 102, the front-end service 110 may determine a permission workflow for approving the event request. In some embodiments, the event request may be provided at step 1 via a first node user device, termed a maker device 101A. The event request may include a request to perform one or more operations relative to a maker token storage.

At step 2, the front-end service 110 may transmit a balance inquiry request to the asset database 140 based on the event request. In some embodiments, the event request may include a data attribute including a number of tokens needed for effectuating a movement of tokens. In some embodiments, the movement of tokens corresponds to an account operation relative to a user account associated with the maker device 101A. Thus, the front-end service 110 may issue the balance inquiry request to query a balance of assets in the user account.

At step 3, the asset database 140 may return the asset balance in a balance inquiry response. In some embodiments, the balance inquiry response may specify a quantity or value of assets associated with the user account of the maker device 101A.

At step 4, where the quantity or value of assets associated with the user account is greater than the number of tokens needed for effectuating the movement of tokens of the event request, the front-end service 110 may produce a permission request. In some embodiments, the permission request may include, e.g., the data attributes of the event request, the quantity or value of assets associated with the user account, among other suitable data attributes characterizing the movement of the number of tokens. In some embodiments, the front-end service 110 may communicate the permission request to the workflow service 120 for entry of the event request into a transaction queue of the workflow service.

At step 5, the workflow service 120 may perform an event validation based on the permission request. In some embodiments, the event validation may include appending the data attributes of the event request to the transaction queue and updating an event log record database and transaction queue token quantity. In some embodiments, based on the transaction queue token quantity, the number of tokens associated with the event request and a number of tokens in the maker token storage, the workflow service 120 may approve the permission request.

At step 6, the workflow service 120 may send a permission response to the front-end service 110 specifying that the movement of tokens is approved.

At step 7, in response to the permission response, the front-end service 110 may provide the permission response to an approver device 101B. In some embodiments, the approver device 101B may include, e.g., a computing device associated with a supervisory or administrative node of the hybrid blockchain platform 100. In some embodiments, the approver device 101B may be responsible for verifying permission responses, e.g., where the permission response includes an exception or error. Accordingly, an approver user at the approver device 101B may select via a suitable permission GUI presented by the front-end service 110, the data attributes associated with the movement of the quantity of the tokens with respect to the maker token storage.

At step 8, where the approver user approves of the data attributes, the approver user may select to approve the movement via the permission GUI, causing the approver device 101B to send a permission to the front-end service 110. In some embodiments, the permission may include an approved event request including the data attributes of the movement and/or an indication of the permission.

At step 9, the front-end service 110 may communicate the permission to the workflow service 120. In response, at step 10, the workflow service 120 may return a permission acknowledgement acknowledging receipt of the permission.

At step 11, upon sending the permission acknowledgement, the workflow service 120 may issue an initiate event command to the back-end service 130. In some embodiments, the initiate event command may include, e.g., one or more task-related messages 104 to trigger processing the event request and the movement of the number of tokens. In some embodiments, the task-related message(s) 104 may include, e.g., one or more tasks identified by the workflow service 120 as associated with the event request. In some embodiments, the initiate event command may cause an event processing 200 sequence associated with the operations of the event request, such as, e.g., triggering a smart contract associated with the movement of the quantity of the tokens on the blockchain 150. In some embodiments, the issuance of the initiate event command may also cause the workflow service 120 to update the transaction queue to remove the event request from the event log record database and remove the number of tokens from the transaction queue token quantity.

At step 12, the front-end service 110 may confirm to the maker device 101A the event processing 200, e.g., via an event acknowledgement. In some embodiments, the event acknowledgement may cause an update to the event control GUI of the maker device 101A to reflect the movement of the quantity of the tokens and/or update a displayed availability of tokens in the maker token storage.

Figure 3:
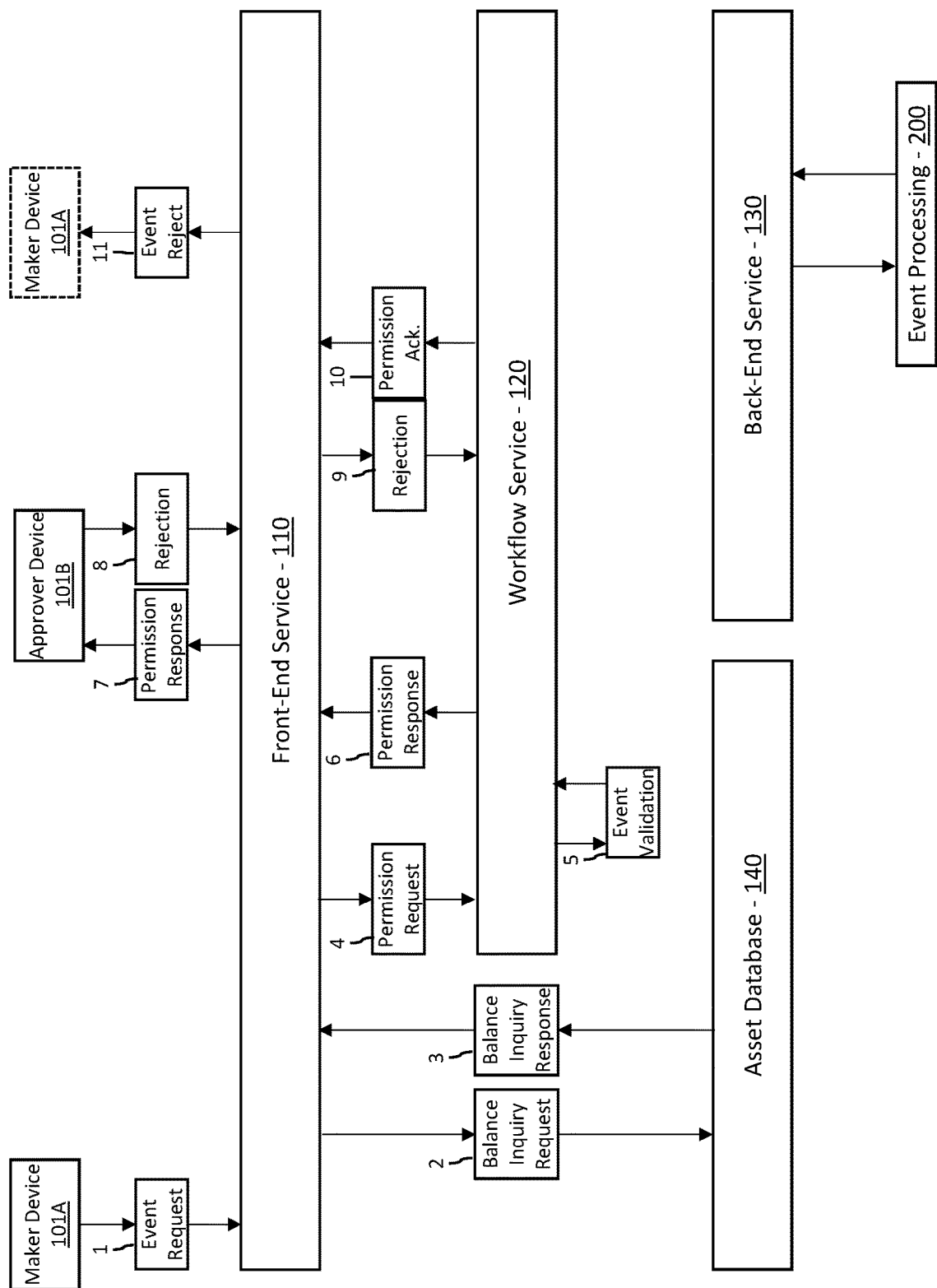
FIG. 3 illustrates another workflow orchestration for event request permission via the workflow service for controlling blockchain events in accordance with one or more embodiments of the present disclosure.

FIG. 3 illustrates another workflow orchestration for event request permission via the workflow service for controlling blockchain events in accordance with one or more embodiments of the present disclosure.

In some embodiments, upon receiving an event request 102, the front-end service 110 may determine a permission workflow for approving the event request. In some embodiments, the event request may be provided at step 1 via a first node user device, termed a maker device 101A. The event request may include a request to perform one or more operations relative to a maker token storage.

At step 2, the front-end service 110 may transmit a balance inquiry request to the asset database 140 based on the event request. In some embodiments, the event request may include a data attribute including a number of tokens needed for effectuating a movement of tokens. In some embodiments, the movement of tokens corresponds to an account operation relative to a user account associated with the maker device 101A. Thus, the front-end service 110 may issue the balance inquiry request to query a balance of assets in the user account.

At step 3, the asset database 140 may return the asset balance in a balance inquiry response. In some embodiments, the balance inquiry response may specify a quantity or value of assets associated with the user account of the maker device 101A.

At step 4, where the quantity or value of assets associated with the user account is greater than the number of tokens needed for effectuating the movement of tokens of the event request, the front-end service 110 may produce a permission request. In some embodiments, the permission request may include, e.g., the data attributes of the event request, the quantity or value of assets associated with the user account, among other suitable data attributes characterizing the movement of the number of tokens. In some embodiments, the front-end service 110 may communicate the permission request to the workflow service 120 for entry of the event request into a transaction queue of the workflow service.

At step 5, the workflow service 120 may perform an event validation based on the permission request. In some embodiments, the event validation may include appending the data attributes of the event request to the transaction queue and updating an event log record database and transaction queue token quantity. In some embodiments, based on the transaction queue token quantity, the number of tokens associated with the event request and a number of tokens in the maker token storage, the workflow service 120 may approve the permission request.

At step 6, the workflow service 120 may send a permission response to the front-end service 110 specifying that the movement of tokens is approved.

At step 7, in response to the permission response, the front-end service 110 may provide the permission response to an approver device 101B. In some embodiments, the approver device 101B may include, e.g., a computing device associated with a supervisory or administrative node of the hybrid blockchain platform 100. In some embodiments, the approver device 101B may be responsible for verifying permission responses, e.g., where the permission response includes an exception or error. Accordingly, an approver user at the approver device 101B may select via a suitable permission GUI presented by the front-end service 110, the data attributes associated with the movement of the quantity of the tokens with respect to the maker token storage.

At step 8, where the approver user rejects the data attributes, the approver user may select to reject the movement via the permission GUI, causing the approver device 101B to send a rejection to the front-end service 110. In some embodiments, the rejection may include a rejected event request including the data attributes of the movement and/or an indication of the rejection.

At step 9, the front-end service 110 may communicate the rejection to the workflow service 120. In response, the workflow service 120 may update the transaction queue to remove the event request from the event log record database and remove the number of tokens from the transaction queue token quantity. In some embodiments, at step 10, the workflow service 120 may then return a permission rejection acknowledging the rejection.

At step 11, upon sending the permission rejection, the front-end service 110 may confirm to the maker device 101A the permission rejection, e.g., via an update to the event control GUI of the maker device 101A to reflect a rejection of the movement of the quantity of the tokens.

Figure 4:
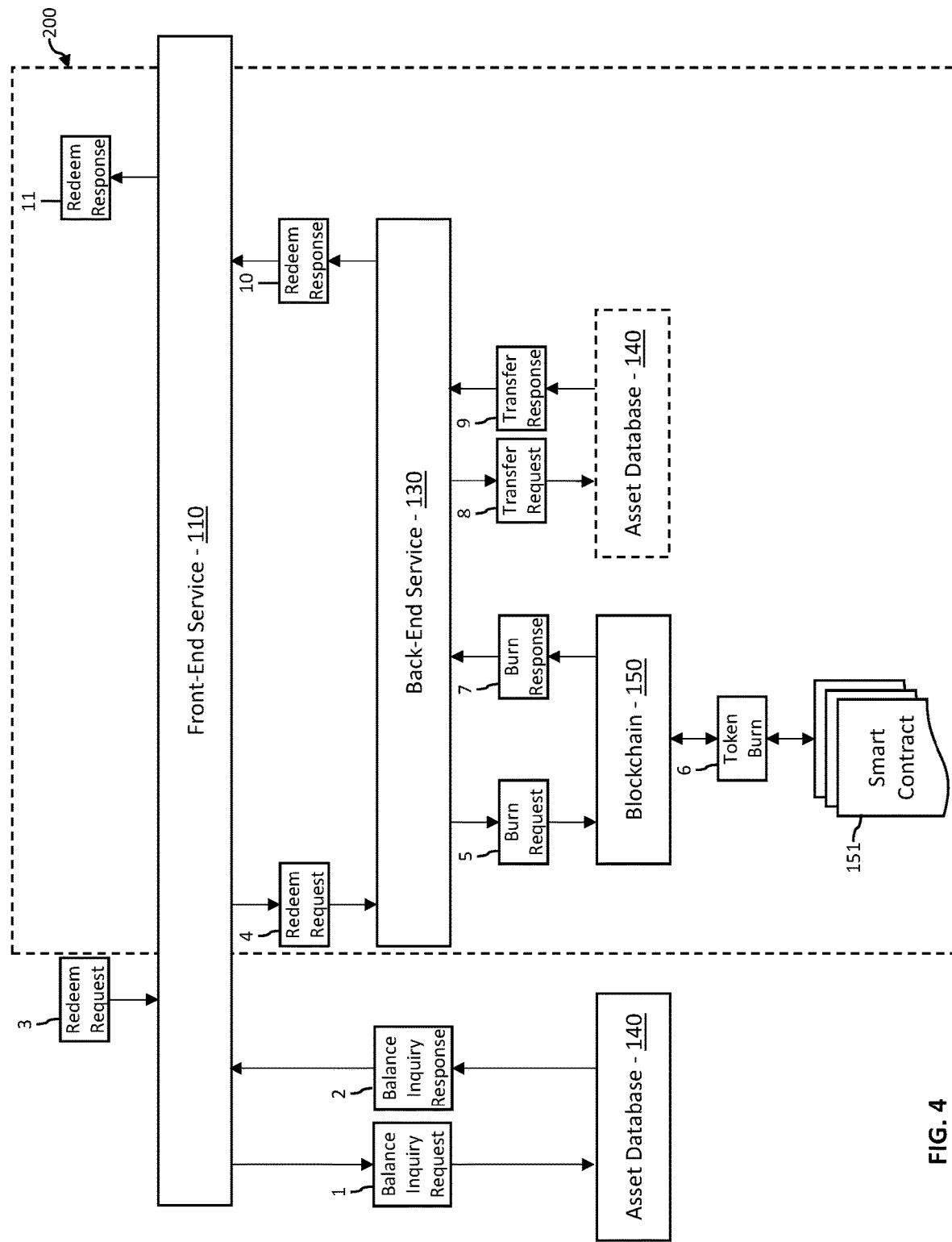
FIG. 4 illustrates a workflow orchestration for a token redeem event request and event processing based on the workflow service for controlling blockchain events in accordance with one or more embodiments of the present disclosure.

FIG. 4 illustrates a workflow orchestration for a token redeem event request and event processing based on the workflow service for controlling blockchain events in accordance with one or more embodiments of the present disclosure.

At step 1, the front-end service 110 may transmit a balance inquiry request to the asset database 140 to identify a balance of assets of a particular user account. Thus, the front-end service 110 may issue the balance inquiry request to query a balance of assets in the user account.

At step 2, the asset database 140 may return the asset balance in a balance inquiry response. In some embodiments, the balance inquiry response may specify a quantity or value of assets associated with a user account of a user device, such as a maker device.

In some embodiments, the front-end service 110 may receive, at step 3, an event request, e.g., from the user device 101, including a redeem request. In some embodiments, the event request may require permission before being acknowledged and provided to the event processing 200.

Accordingly, at step 4, the front-end service 110 may begin event processing 200 upon permission via the workflow service 120 (e.g., as illustrated in FIG. 2 above). In some embodiments, to perform event processing 200, the front-end service 100 may provide the redeem request to the back-end service 130. In some embodiments, the redeem request may include, e.g., the data attributes of the event request such as the quantity or value of assets associated with the user account, the quantity or value of tokens to be redeemed, a user identifier identifying the user and/or the user account, a transaction identifier, among other suitable data attributes characterizing the movement of the number of tokens in a redeem operation.

At step 5, the back-end service 130 may instruct, via a burn request, the blockchain 150 to perform a token movement corresponding to the asset movement. In some embodiments, the movement of tokens is to reflect the removal of assets, e.g., from the user account of the asset database 140, and thus includes a corresponding removal of tokens from the token storage by burning the tokens from the blockchain 150 using the smart contract 151. In some embodiments, rather burning the tokens, the burn request may include a transfer request form the token storage to an omnibus token storage or other custodial and/or omnibus token storing structure.

In some embodiments, the blockchain 150 may employ a smart contract 151 to perform the token burn at step 8. In some embodiments, the removal may include a movement to a custodial or omnibus token storage mapped to the omnibus account. In some embodiments, the removal is a burn of tokens, thereby removing the tokens from the blockchain 150.

At step 9, the blockchain 150 may return a burn response to the back-end service 130 to acknowledge the token burn and the change to the user's token storage.

In some embodiments, based on the data attributes of the event request, the back-end service 130 may initiate a transfer request at step 8. In some embodiments, as an exemplary illustration, step 7 is depicted as occurring after steps 5, 6 and 7, but in some embodiments, step 8 may be performed before or concurrently with any one or more of step 5, step 6 and/or step 7. In some embodiments, the transfer request is sent to the asset database 140 to request a movement of assets out of the user account such that the user may extract and use the assets outside of the user account. In some embodiments, the movement of assets may include a movement out of the user account into an omnibus account (see, e.g., the smart contract 151 mapping illustrated in FIG. 1B above). In some embodiments, the omnibus account is a custodian of assets to enable asset use with systems and entities outside of the asset database 140. For example, in order to withdraw money from an automated teller machine (ATM), the redeem request may cause the back-end service 130 to issue a transfer request from the user account to the omnibus account such that the omnibus account may provide an equivalent value in cash to the ATM for dispensation. The omnibus account may serve a similar role in transferring assets to another entity or account that is distinct from the omnibus account, the asset database 140 and/or the hybrid blockchain platform 100, such as another bank or other financial entity.

In some embodiments, upon completion of the transfer, at step 9 the asset database 140 may return a transfer response to the back-end service 130. In some embodiments, the transfer response may acknowledge a completion of an operation in the asset database 140 include the transfer for the redemption of tokens to extract assets from the user account.

At step 10, in response to the burn response, the back-end service 130 may confirm to the front-end service the redemption of tokens via a redeem response.

At step 11, in response to the redeem response, the front-end service 110 may confirm to the user device the event processing 200 including the redeem response. In some embodiments, the redeem response may cause an update to the event control GUI of the user device 101 to reflect the redemption of the quantity of the tokens and/or update a displayed availability of tokens in the token storage less the redeemed tokens.

Figure 5:
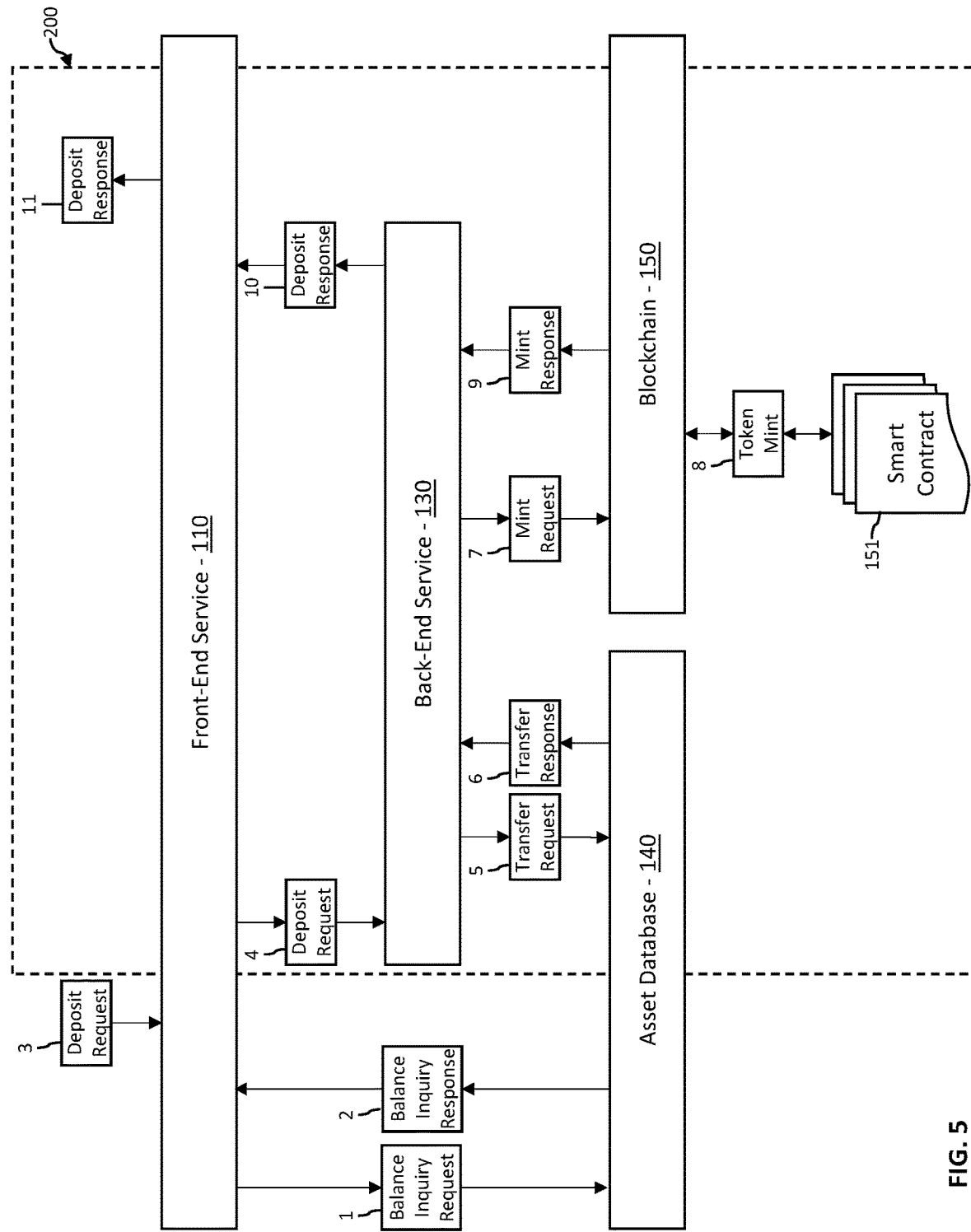
FIG. 5 illustrates a workflow orchestration for a token deposit event request and event processing based on the workflow service for controlling blockchain events in accordance with one or more embodiments of the present disclosure.

FIG. 5 illustrates a workflow orchestration for a token deposit event request and event processing based on the workflow service for controlling blockchain events in accordance with one or more embodiments of the present disclosure.

At step 1, the front-end service 110 may transmit a balance inquiry request to the asset database 140 to identify a balance of assets of a particular user account. Thus, the front-end service 110 may issue the balance inquiry request to query a balance of assets in the user account.

At step 2, the asset database 140 may return the asset balance in a balance inquiry response. In some embodiments, the balance inquiry response may specify a quantity or value of assets associated with a user account of a user device, such as a maker device.

In some embodiments, the front-end service 110 may receive, at step 3, an event request, e.g., from the user device 101, including a deposit request. In some embodiments, the event request may require permission before being acknowledged and provided to the event processing 200.

Accordingly, at step 4, the front-end service 110 may begin event processing 200 upon permission via the workflow service 120 (e.g., as illustrated in FIG. 2 above). In some embodiments, to perform event processing 200, the front-end service 100 may provide the deposit request to the back-end service 130. In some embodiments, the deposit request may include, e.g., the data attributes of the event request such as the quantity or value of assets associated with the user account, the quantity or value of tokens to be deposited, a user identifier identifying the user and/or the user account, a transaction identifier, among other suitable data attributes characterizing the movement of the number of tokens in a deposit operation.

In some embodiments, based on the data attributes of the event request, the back-end service 130 may initiate a transfer request at step 5. In some embodiments, the transfer request is sent to the asset database 140 to request a movement of assets into the user account from outside of the user account. In some embodiments, the movement of assets may include a movement into the user account from an omnibus account (see, e.g., the smart contract 151 mapping illustrated in FIG. 1B above). In some embodiments, the omnibus account is a custodian of assets to enable asset use with systems and entities outside of the asset database 140. For example, in order to deposit money at an automated teller machine (ATM), the deposit request may cause the back-end service 130 to issue a transfer request from the omnibus account to the user account based on cash deposited at the ATM, such that the omnibus account may provide an equivalent value in assets to the user account. The omnibus account may serve a similar role in transferring assets from another entity or account that is distinct from the omnibus account, the asset database 140 and/or the hybrid blockchain platform 100, such as another bank or other financial entity.

In some embodiments, upon completion of the transfer, at step 6 the asset database 140 may return a transfer response to the back-end service 130. In some embodiments, the transfer response may acknowledge a completion of an operation in the asset database 140 including the transfer for the deposit of tokens into the user account.

At step 7, the back-end service 130 may instruct, via a mint request, the blockchain 150 to perform a token movement corresponding to the asset movement. In some embodiments, as an exemplary illustration, step 7 is depicted as occurring after steps 5 and 6, but in some embodiments, step 7 may be performed first or concurrently with step 5 and/or step 6. In some embodiments, because the assets are transferred into the user account, the movement of tokens is to reflect the addition of assets, and thus includes a corresponding addition of tokens into the token storage.

In some embodiments, the blockchain 150 may employ a smart contract 151 to perform the token mint at step 8. In some embodiments, the addition of tokens may include a movement from a custodial or omnibus token storage mapped to the omnibus account. In some embodiments, the addition of tokens is a mint of tokens, thereby creating the tokens on the blockchain 150 and assigning the created tokens to the token storage mapped to the user account.

At step 9, the blockchain 150 may return a mint response to the back-end service 130 to acknowledge the token mint and the change to the user's token storage.

At step 10, in response to the mint response, the back-end service 130 may confirm to the front-end service the deposit of tokens via a deposit response.

At step 11, in response to the deposit response, the front-end service 110 may confirm to the user device the event processing 200 including the deposit response. In some embodiments, the deposit response may cause an update to the event control GUI of the user device 101 to reflect the deposit of the quantity of the tokens and/or update a displayed availability of tokens in the token storage including the deposited tokens.

Figure 6:
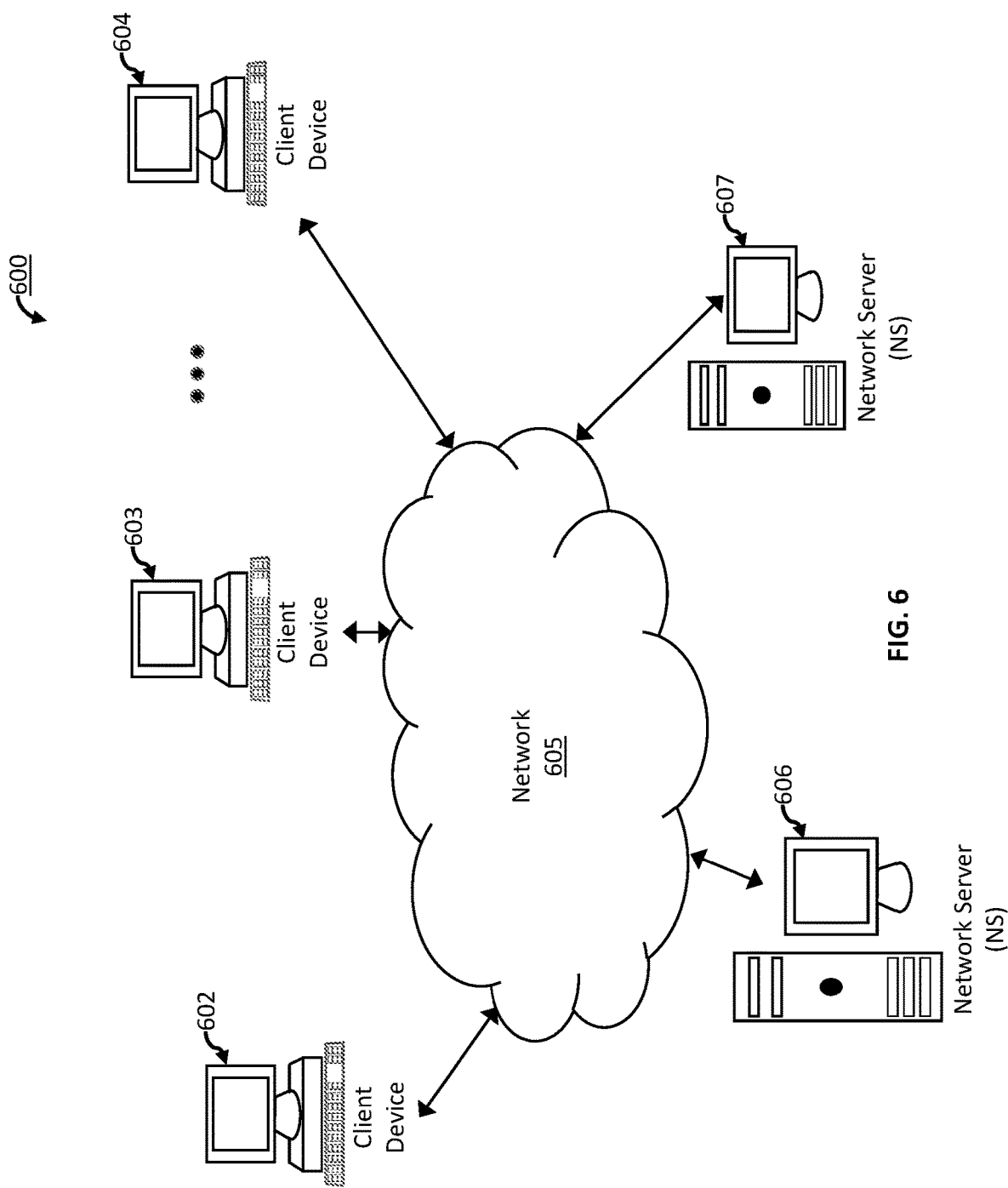
FIG. 6 is a block diagram of an exemplary computer-based system for event request permission via a workflow service of a blockchain environment in accordance with one or more embodiments of the present disclosure.

FIG. 6 depicts a block diagram of an exemplary computer-based system and platform 600 for event request permission via a workflow service of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 600 may be configured to manage a large number of members and concurrent transactions, as detailed herein. In some embodiments, the exemplary computer-based system and platform 600 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 6, member computing device 602, member computing device 603 through member computing device 604 (e.g., clients) of the exemplary computer-based system and platform 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++, Python, PHP and/or other suitable programming language. In some embodiment of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 602-604 may be specifically programmed include or execute an application to perform a variety of possible tasks, such as, without limitation, messaging functionality, browsing, searching, playing, streaming, or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Apache on Linux or Microsoft IIS (Internet Information Services). In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 7:
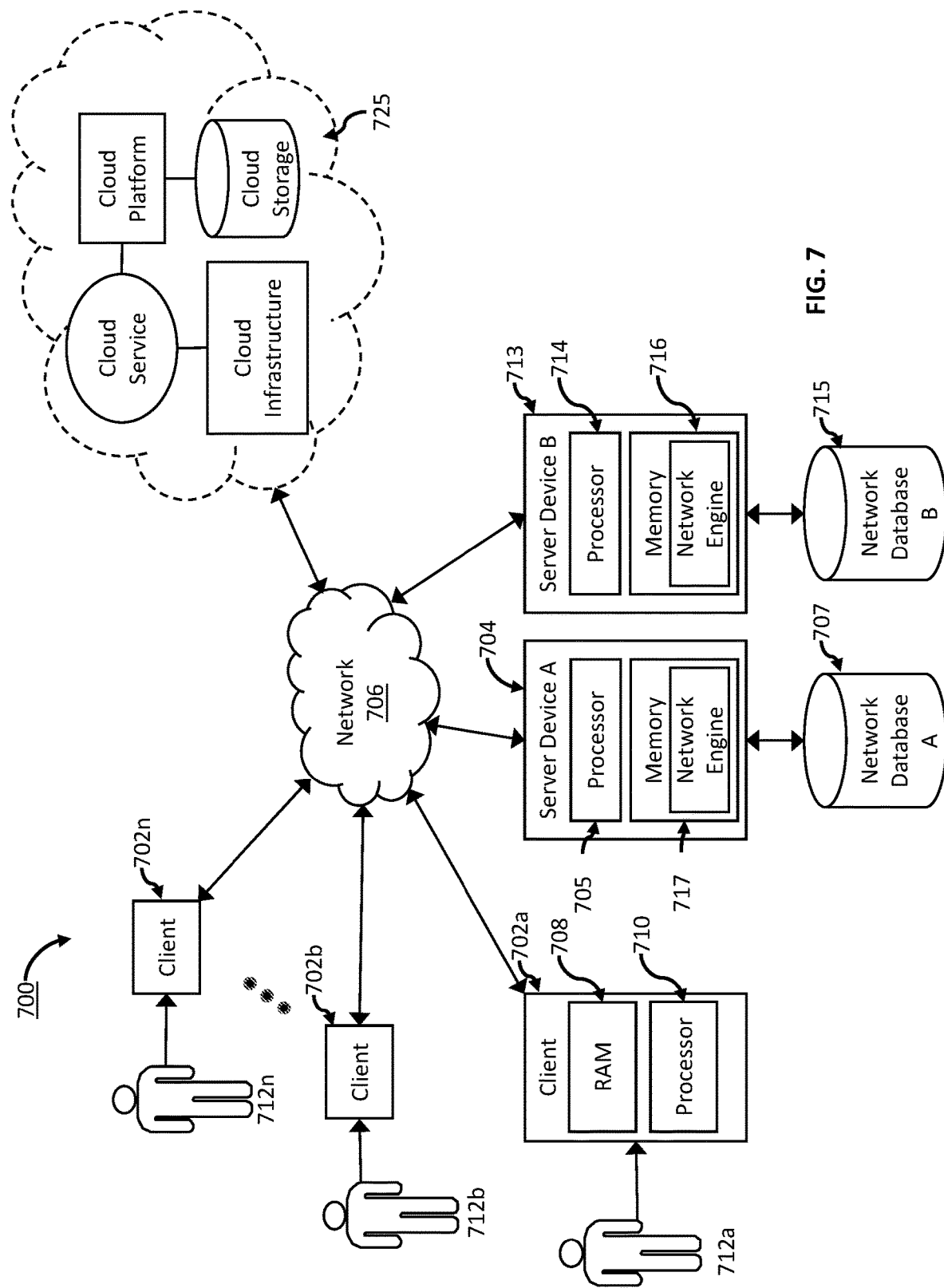
FIG. 7 depicts a block diagram of another exemplary computer-based system and platform for event request permission via a workflow service of a blockchain environment in accordance with one or more embodiments of the present disclosure.

FIG. 7 depicts a block diagram of another exemplary computer-based system and platform 700 for event request permission via a workflow service of a blockchain environment in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 702a, member computing device 702b through member computing device 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape, or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™, Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, user 712a, user 712b through user 712n, may communicate over the exemplary network 706 with each other and/or with other systems and/or devices coupled to the network 706. As shown in FIG. 7, exemplary server devices 704 and 713 may include processor 705 and processor 714, respectively, as well as memory 717 and memory 716, respectively. In some embodiments, the server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
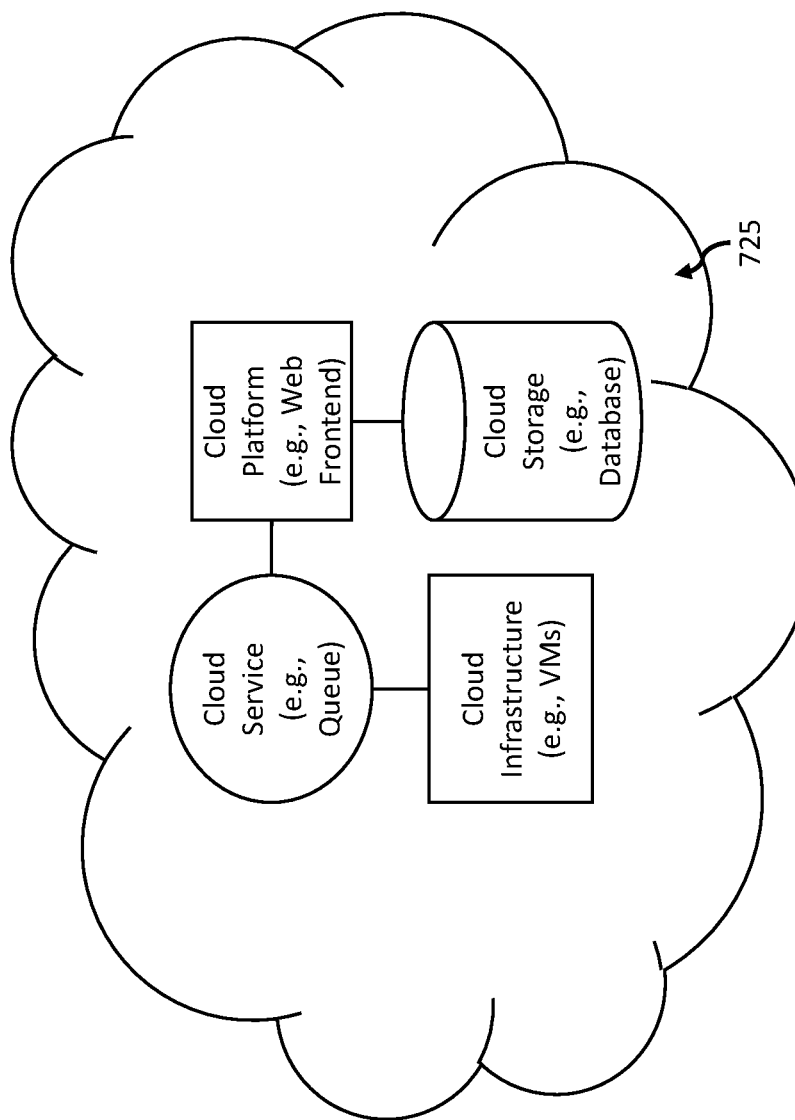
FIG. 8 depicts illustrative schematics of an exemplary implementation of the cloud computing/architecture(s) in which embodiments of a system for event request permission via a workflow service of a blockchain environment may be specifically configured to operate in accordance with some embodiments of the present disclosure.
Figure 9:
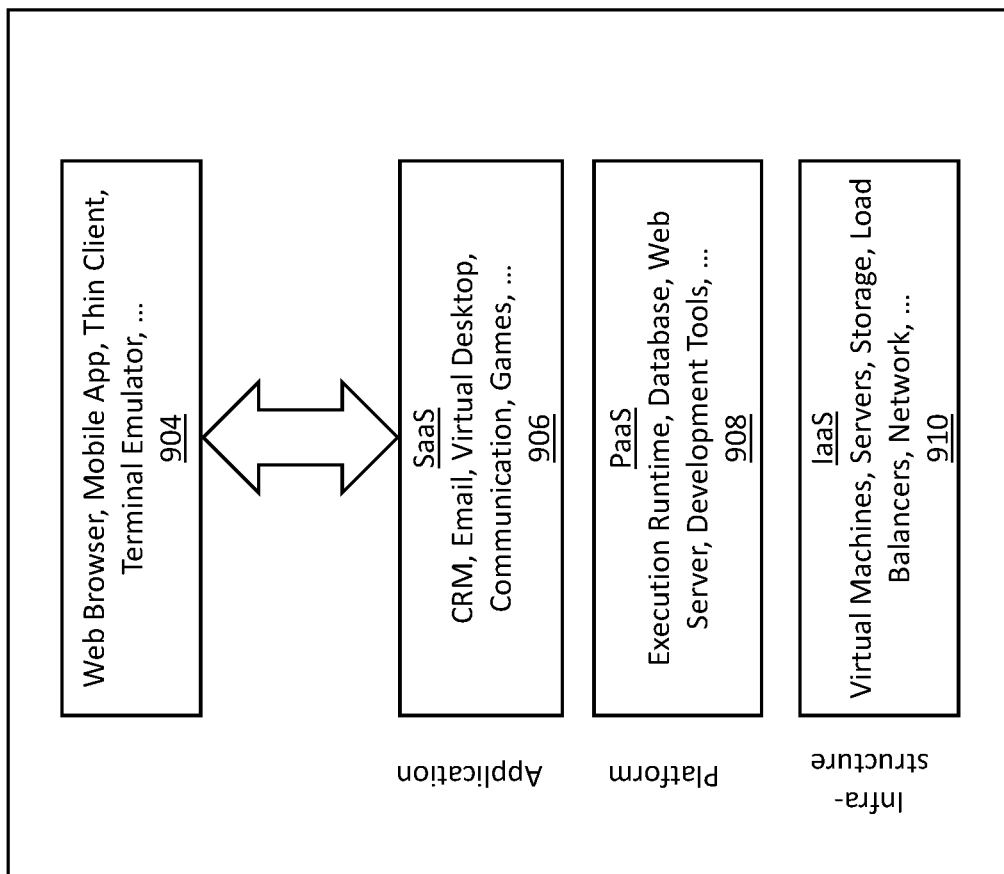
FIG. 9 depicts illustrative schematics of another exemplary implementation of the cloud computing/architecture(s) in which embodiments of a system for event request permission via a workflow service of a blockchain environment may be specifically configured to operate in accordance with some embodiments of the present disclosure.

In some embodiments, the exemplary inventive computer-based systems/platforms, the exemplary inventive computer-based devices, and/or the exemplary inventive computer-based components of the present disclosure may be specifically configured to operate in a cloud computing/architecture 725 such as, but not limiting to: infrastructure a service (IaaS) 910, platform as a service (PaaS) 908, and/or software as a service (SaaS) 906 using a web browser, mobile app, thin client, terminal emulator or other endpoint 904. FIGS. 8 and 9 illustrate schematics of exemplary implementations of the cloud computing/architecture(s) in which the exemplary inventive computer-based systems for event request permission via a workflow service of a blockchain environment of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application.

For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

As used herein, the term "mobile device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be transferred around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session or can refer to an automated software application which receives the data and stores or processes the data.

The aforementioned examples are, of course, illustrative, and not restrictive.

At least some aspects of the present disclosure will now be described with reference to the following numbered clauses.

1. A method including:
    receiving, by at least one processor, from a first node associated with a first token storage, a transfer event request for a movement of a number of tokens relative to the first token storage via a distributed network;
    where the distributed network includes a blockchain;
    accessing, by at least one processor, an event log record database;
        where the event log record database includes a transfer event logged token number indicating a total logged number of tokens, including:
            i) a total number of tokens of pending transfer event request records with respect to the first token storage, and
            ii) a total number of tokens in the first token storage;
    determining, by the at least one processor, a first permission for generating a transfer event request record to the event log record database based on:
        the transfer event request and
        the number of the tokens exceeding the total logged number of tokens as logged in the event log record database;
    determining, by the at least one processor, an updated total logged number of tokens by generating the transfer event request record to the pending transfer event request records of the event log record database so as to remove the number of tokens from the total number of tokens of the pending event request records;
    transmitting, by the at least one processor, the transfer event request to the distributed network;
    utilizing, by the at least one processor, at least one smart contract to cause the number of the tokens to be transferred on the blockchain based at least in part on the transfer event request and the event log record;
    receiving, by the at least one processor, a blockchain write permission determination by the distributed network for the movement of the number of tokens on the distributed network; and
    determining, by the at least one processor, an updated total number of tokens in the first token storage based at least in part on the transfer event log record and the blockchain write permission determination.

2. A system including:
    at least one processor in communication with at least one storage device, where the at least one processor is configured to access software instructions in the at least one storage device that cause the at least one processor to perform steps to:
    receive from a first node associated with a first token storage, a transfer event request for a movement of a number of tokens relative to the first token storage via a distributed network;
        where the distributed network includes a blockchain;
    access an event log record database;
        where the event log record database includes transfer event logged token number indicating a total logged number of tokens including:
            i) a total number of tokens of pending transfer event request records with respect to the first token storage, and
            ii) a total number of tokens in the first token storage;
    determine a first permission for generating a transfer event request record to the event log record database based on:
        the transfer event request and
        the number of the tokens exceeding the total logged number of tokens as logged in the event log record database;
    determine an updated total logged number of tokens by generating the transfer event request record to the pending transfer event request records of the event log record database so as to remove the number of tokens from the total number of tokens of the pending event request records;
    transmit the transfer event request to the distributed network;
    utilize at least one smart contract to cause the number of the tokens to be transferred on the blockchain based at least in part on the transfer event request and the event log record;
    receive a blockchain write permission determination by the distributed network for the movement of the number of tokens on the distributed network; and
    determine an updated total number of tokens in the first token storage based at least in part on the transfer event log record and the blockchain write permission determination.

3. The methods and/or systems as recited in clauses 1 and/or 2, further including:
    transmitting, by the at least one processor, the transfer event request to at least one second node on the distributed network;

where the at least one processor includes at least one approver node of a plurality of nodes in the distributed network; and receiving, by the at least one processor, a second permission from the at least one second node approving the transfer event request.

4. The methods and/or systems as recited in clauses 1 and/or 2 and/or 3, where the at least one approver node is permissioned to make transactions requests and to approve transfer event requests.

5. The methods and/or systems as recited in clauses 1 and/or 2, where the first node includes a maker node permissioned to make transfer event requests.

6. The methods and/or systems as recited in clauses 1 and/or 2, further including:

receiving, by the at least one processor, the transfer event request including a token deposit request;
where the token deposit request is for a deposit of the number of tokens into the first token storage;

generating, by the at least one processor, at least one asset deposit operation instruction to an asset database;
where the at least one asset deposit operation instruction causes the asset database to add an asset quantity to a first user account;
where the asset quantity is associated with the number of tokens;
where the first user account is associated with the first token storage; and utilizing, by the at least one processor, the at least one smart contract to cause the number of the tokens to be added to the first token storage.

7. The methods and/or systems as recited in clauses 1 and/or 2 and/or 6, further including utilizing, by the at least one processor, the at least one smart contract to cause the number of the tokens to be minted on the blockchain based at least in part on the transfer event request so as to and the number of tokens to the first token storage.

8. The methods and/or systems as recited in clauses 1 and/or 2, further including:

receiving, by the at least one processor, the transfer event request including a token redeem request;
where the token redeem request is for a redemption of tokens from the first token storage;

generating, by the at least one processor, at least one asset redeem operation instruction to an asset database;
where the at least one asset redeem operation instruction causes the asset database to remove an asset quantity to a first user account;
where the asset quantity is associated with the number of tokens;
where the first user account is associated with the first token storage; and utilizing, by the at least one processor, the at least one smart contract to cause the number of the tokens to be removed to the first token storage.

9. The methods and/or systems as recited in clauses 1 and/or 2 and/or 8, further including utilizing, by the at least one processor, the at least one smart contract to cause the number of the tokens to be burned from the blockchain based at least in part on the transfer event request so as to remove the number of tokens to the first token storage.

10. The methods and/or systems as recited in clauses 1 and/or 2, further including:

receiving, by the at least one processor, the transfer event request including a token send request;
where the token send request is for a transfer of tokens from the first token storage to a second token storage or a second node on the distributed network;

generating, by the at least one processor, at least one asset transfer operation instruction to an asset database;
where the at least one asset transfer operation instruction causes the asset database to:
remove an asset quantity to a first user account and add the asset quantity to a second user account;
where the asset quantity is associated with the number of tokens;
where the first user account is associated with the first token storage;
where the second user account is associated with the second token storage;

utilizing, by the at least one processor, the at least one smart contract to cause the number of the tokens to be removed to the first token storage; and utilizing, by the at least one processor, the at least one second smart contract to cause the number of the tokens to be added to the second token storage.

11. The methods and/or systems as recited in clauses 1 and/or 2 and/or 10, further including:

utilizing, by the at least one processor, the at least one smart contract to cause the number of the tokens to be burned from the blockchain based at least in part on the transfer event request so as to remove the number of tokens to the first token storage; and further including utilizing, by the at least one processor, the at least one second smart contract to cause the number of the tokens to be minted on the blockchain based at least in part on the transfer event request so as to add the number of tokens to the second token storage.

12. The methods and/or systems as recited in clauses 1 and/or 2, further including instructing, by the at least one processor, at least one account database to perform a monetary movement in at least one account associated with the first token storage based at least in part on the movement of the number of tokens relative to the first token via the distributed network.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:

receiving, by at least one processor, from a first node associated with a first token storage, a transfer event request for a movement of a number of tokens relative to the first token storage via a distributed network;
wherein the distributed network comprises a blockchain;

accessing, by at least one processor, an event log record database;
wherein the event log record database comprises a pending transfer event log;

wherein the pending transfer event log comprises:
i) a total number of pending tokens of pending transfer event request records with respect to the first token storage, and
ii) a total number of available tokens in the first token storage;
determining, by the at least one processor, a first permission for generating a transfer event request record to the event log record database based on:
the transfer event request and
the total number of the available tokens exceeding a sum of the total number of pending tokens and the number of tokens associated with the transfer event request;
determining, by the at least one processor, an updated total logged number of pending tokens by generating the transfer event request record to the pending transfer event request records of the pending transfer event log;
transmitting, by the at least one processor, the transfer event request to the distributed network;
utilizing, by the at least one processor, at least one smart contract to cause the number of the tokens to be transferred on the blockchain based at least in part on the transfer event request and the event log record;
receiving, by the at least one processor, a blockchain write permission determination by the distributed network for the movement of the number of tokens on the distributed network; and
determining, by the at least one processor, an updated total number of available tokens in the first token storage based at least in part on the transfer event log record and the blockchain write permission determination.

2. The method as recited in claim 1, further comprising:
transmitting, by the at least one processor, the transfer event request to at least one second node on the distributed network;
wherein the at least one processor comprises at least one approver node of a plurality of nodes in the distributed network; and
receiving, by the at least one processor, a second permission from the at least one second node approving the transfer event request.

3. The method as recited in claim 2, wherein the at least one approver node is permissioned to make transactions requests and to approve transfer event requests.

4. The method as recited in claim 1, wherein the first node comprises a maker node permissioned to make transfer event requests.

5. The method as recited in claim 1, further comprising:
receiving, by the at least one processor, the transfer event request comprising a token deposit request;
wherein the token deposit request is for a deposit of the number of tokens into the first token storage;
generating, by the at least one processor, at least one asset deposit operation instruction to an asset database;
wherein the at least one asset deposit operation instruction causes the asset database to add an asset quantity to a first user account;
wherein the asset quantity is associated with the number of tokens;
wherein the first user account is associated with the first token storage; and
utilizing, by the at least one processor, the at least one smart contract to cause the number of the tokens to be added to the first token storage.

6. The method as recited in claim 5, further comprising utilizing, by the at least one processor, the at least one smart contract to cause the number of the tokens to be minted on the blockchain based at least in part on the transfer event request so as to add the number of tokens to the first token storage.

7. The method as recited in claim 1, further comprising:
receiving, by the at least one processor, the transfer event request comprising a token redeem request;
wherein the token redeem request is for a redemption of tokens from the first token storage;
generating, by the at least one processor, at least one asset redeem operation instruction to an asset database;
wherein the at least one asset redeem operation instruction causes the asset database to remove an asset quantity to a first user account;
wherein the asset quantity is associated with the number of tokens;
wherein the first user account is associated with the first token storage; and
utilizing, by the at least one processor, the at least one smart contract to cause the number of the tokens to be removed to the first token storage.

8. The method as recited in claim 7, further comprising utilizing, by the at least one processor, the at least one smart contract to cause the number of the tokens to be burned from the blockchain based at least in part on the transfer event request so as to remove the number of tokens to the first token storage.

9. The method as recited in claim 1, further comprising:
receiving, by the at least one processor, the transfer event request comprising a token send request;
wherein the token send request is for a transfer of tokens from the first token storage to a second token storage or a second node on the distributed network;
generating, by the at least one processor, at least one asset transfer operation instruction to an asset database;
wherein the at least one asset transfer operation instruction causes the asset database to:
remove an asset quantity to a first user account and add the asset quantity to a second user account;
wherein the asset quantity is associated with the number of tokens;
wherein the first user account is associated with the first token storage;
wherein the second user account is associated with the second token storage;
utilizing, by the at least one processor, the at least one smart contract to cause the number of the tokens to be removed to the first token storage; and
utilizing, by the at least one processor, the at least one second smart contract to cause the number of the tokens to be added to the second token storage.

10. The method as recited in claim 9, further comprising:
utilizing, by the at least one processor, the at least one smart contract to cause the number of the tokens to be burned from the blockchain based at least in part on the transfer event request so as to remove the number of tokens tG from the first token storage; and
further comprising utilizing, by the at least one processor, the at least one second smart contract to cause the number of the tokens to be minted on the blockchain based at least in part on the transfer event request so as to add the number of tokens to the second token storage.

11. The method as recited in claim 1, further comprising instructing, by the at least one processor, at least one account database to perform a monetary movement in at least one account associated with the first token storage based at least in part on the movement of the number of tokens relative to the first token storage via the distributed network.

12. A system comprising:
at least one processor in communication with at least one storage device, wherein the at least one processor is configured to access software instructions in the at least one storage device that cause the at least one processor to perform steps to:
receive, from a first node associated with a first token storage, a transfer event request for a movement of a number of tokens relative to the first token storage via a distributed network;
wherein the distributed network comprises a blockchain;
access an event log record database;
wherein the event log record database comprises a pending transfer event log;
wherein the pending transfer event log comprises:
i) a total number of pending tokens of pending transfer event request records with respect to the first token storage, and
ii) a total number of available tokens in the first token storage;
determine a first permission for generating a transfer event request record to the event log record database based on:
the transfer event request and
the total number of the available tokens exceeding a sum of the total number of pending tokens and the number of tokens associated with the transfer event request;
determine an updated total logged number of pending tokens by generating the transfer event request record to the pending transfer event request records of the pending transfer event log;
transmit the transfer event request to the distributed network;
utilize at least one smart contract to cause the number of the tokens to be transferred on the blockchain based at least in part on the transfer event request and the event log record;
receive a blockchain write permission determination by the distributed network for the movement of the number of tokens on the distributed network; and
determine an updated total number of available tokens in the first token storage based at least in part on the transfer event log record and the blockchain write permission determination.

13. The system as recited in claim 12, wherein the software instructions in the at least one storage device further cause the at least one processor to perform steps to instruct at least one account database to perform a monetary movement in at least one account associated with the first token storage based at least in part on the movement of the number of tokens relative to the first token via the distributed network.

14. The system as recited in claim 12, wherein the software instructions in the at least one storage device further cause the at least one processor to perform steps to:
receive the transfer event request comprising a token deposit request;
wherein the token deposit request is for a deposit of the number of tokens into the first token storage;
generate at least one asset deposit operation instruction to an asset database;
wherein the at least one asset deposit operation instruction causes the asset database to add an asset quantity to a first user account;
wherein the asset quantity is associated with the number of tokens;
wherein the first user account is associated with the first token storage; and
utilize the at least one smart contract to cause the number of the tokens to be added to the first token storage.

15. The system as recited in claim 14, wherein the software instructions in the at least one storage device further cause the at least one processor to perform steps to utilize the at least one smart contract to cause the number of the tokens to be minted on the blockchain based at least in part on the transfer event request so as to add the number of tokens to the first token storage.

16. The system as recited in claim 12, wherein the software instructions in the at least one storage device further cause the at least one processor to perform steps to:
receive the transfer event request comprising a token redeem request;
wherein the token redeem request is for a redemption of tokens from the first token storage;
generate at least one asset redeem operation instruction to an asset database;
wherein the at least one asset redeem operation instruction causes the asset database to remove an asset quantity to a first user account;
wherein the asset quantity is associated with the number of tokens;
wherein the first user account is associated with the first token storage; and
utilize the at least one smart contract to cause the number of the tokens to be removed to the first token storage.

17. The system as recited in claim 16, wherein the software instructions in the at least one storage device further cause the at least one processor to perform steps to utilize the at least one smart contract to cause the number of the tokens to be burned from the blockchain based at least in part on the transfer event request so as to remove the number of tokens to the first token storage.

18. The system as recited in claim 12, wherein the software instructions in the at least one storage device further cause the at least one processor to perform steps to:
receive the transfer event request comprising a token send request;
wherein the token send request is for a transfer of tokens from the first token storage to a second token storage or a second node on the distributed network;
generate at least one asset transfer operation instruction to an asset database;
wherein the at least one asset transfer operation instruction causes the asset database to:
remove an asset quantity to a first user account and add the asset quantity to a second user account;
wherein the asset quantity is associated with the number of tokens;
wherein the first user account is associated with the first token storage;
wherein the second user account is associated with the second token storage;
utilize the at least one smart contract to cause the number of the tokens to be removed to the first token storage; and
utilize the at least one second smart contract to cause the number of the tokens to be added to the second token storage.

19. The system as recited in claim 18, wherein the software instructions in the at least one storage device further cause the at least one processor to perform steps to:
- utilize the at least one smart contract to cause the number of the tokens to be burned from the blockchain based at least in part on the transfer event request so as to remove the number of tokens from the first token storage; and
- further comprising utilize the at least one second smart contract to cause the number of the tokens to be minted on the blockchain based at least in part on the transfer event request so as to add the number of tokens to the second token storage.

20. The system as recited in claim 12, wherein the software instructions in the at least one storage device further cause the at least one processor to perform steps to instruct at least one account database to perform a monetary movement in at least one account associated with the first token storage based at least in part on the movement of the number of tokens relative to the first token storage via the distributed network.

\* \* \* \* \*